May 12, 1936.  S. MAGATON  2,040,700
SMOKE AND DUST ABSORBING APPARATUS
Filed Oct. 12, 1934   3 Sheets-Sheet 1
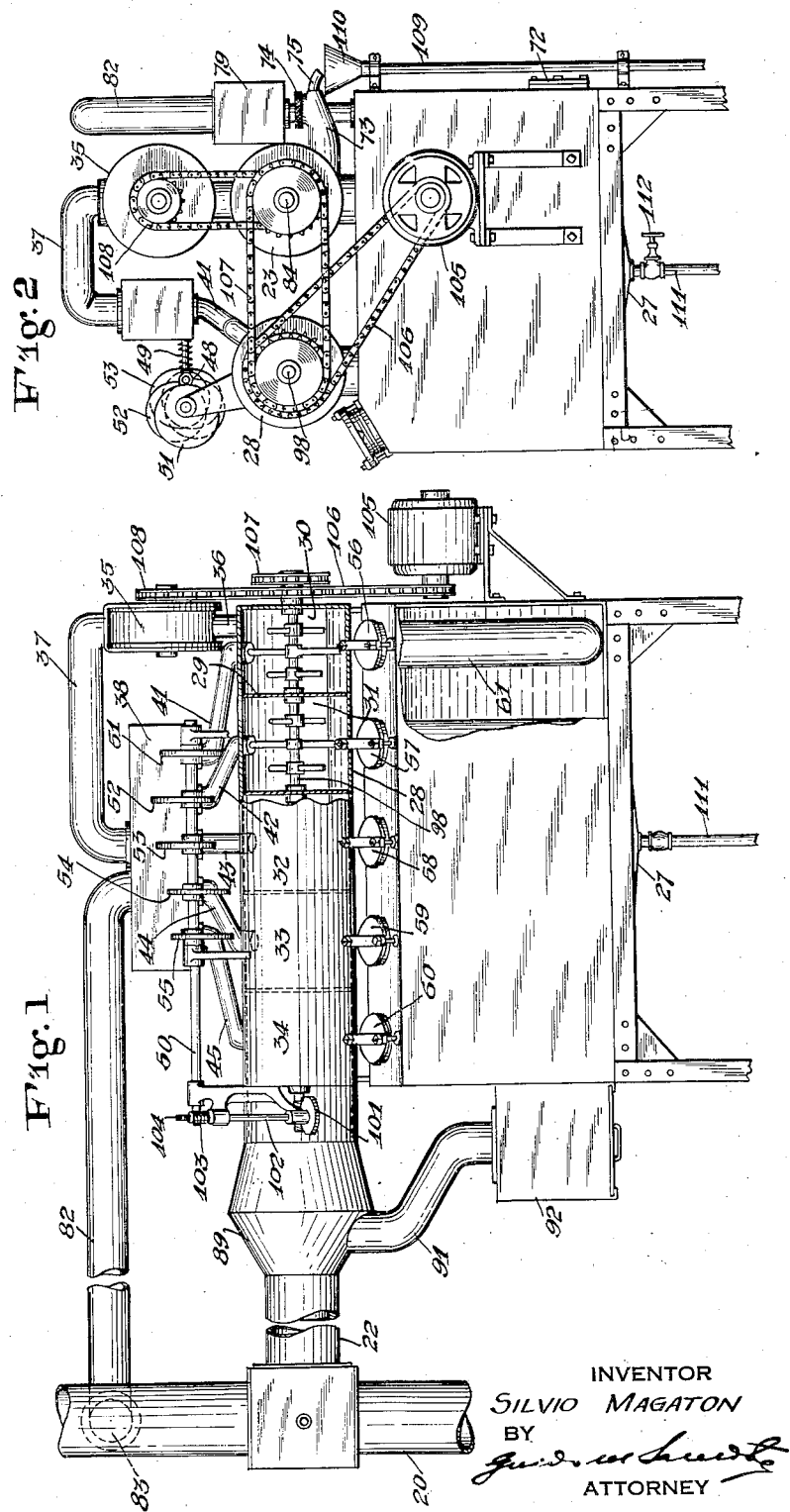
INVENTOR
SILVIO MAGATON
BY
ATTORNEY May 12, 1936.  S. MAGATON  2,040,700
SMOKE AND DUST ABSORBING APPARATUS
Filed Oct. 12, 1934  3 Sheets-Sheet 2
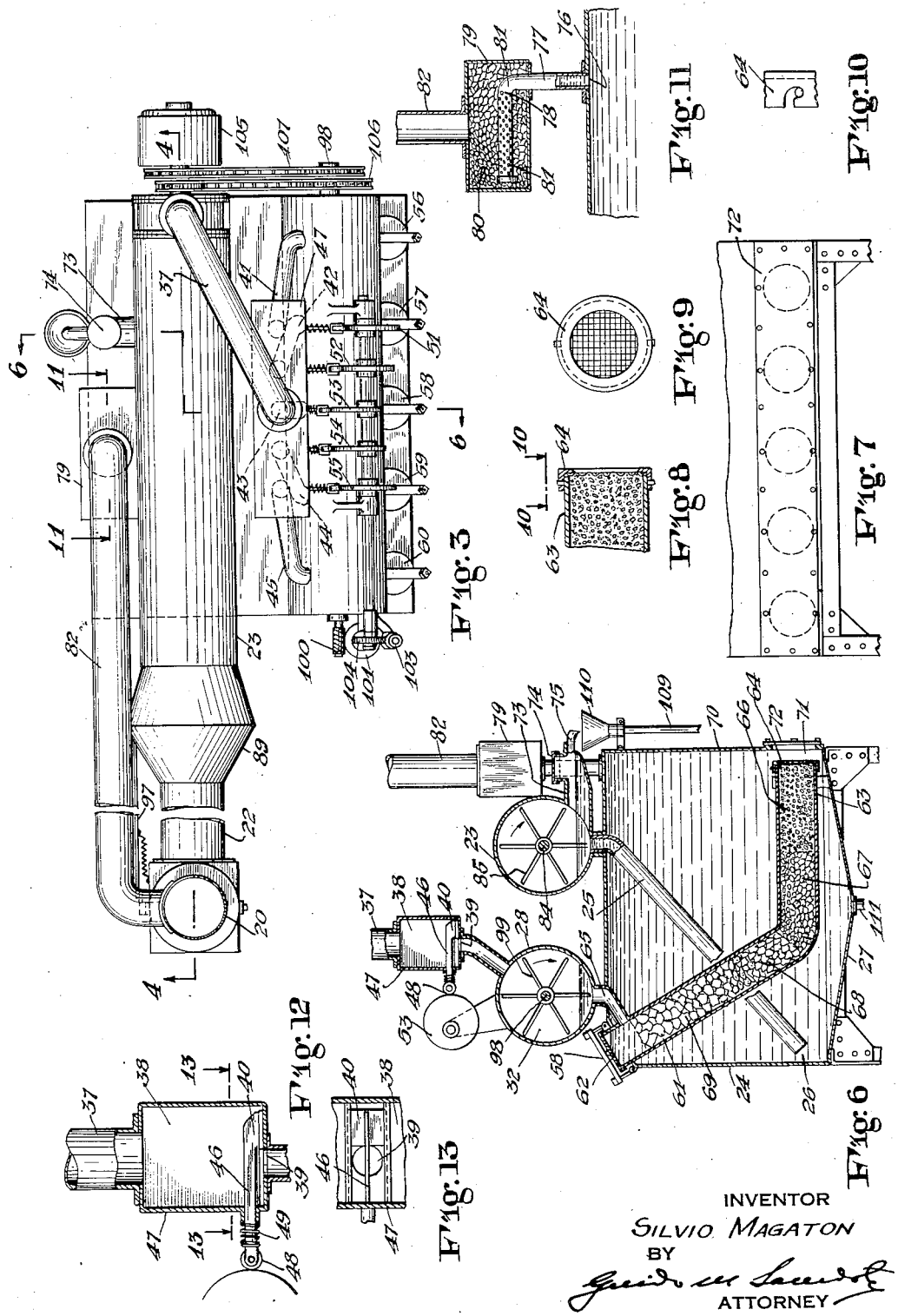
INVENTOR
SILVIO MAGATON
BY
ATTORNEY May 12, 1936.  S. MAGATON  2,040,700
SMOKE AND DUST ABSORBING APPARATUS
Filed Oct. 12, 1934  3 Sheets-Sheet 3
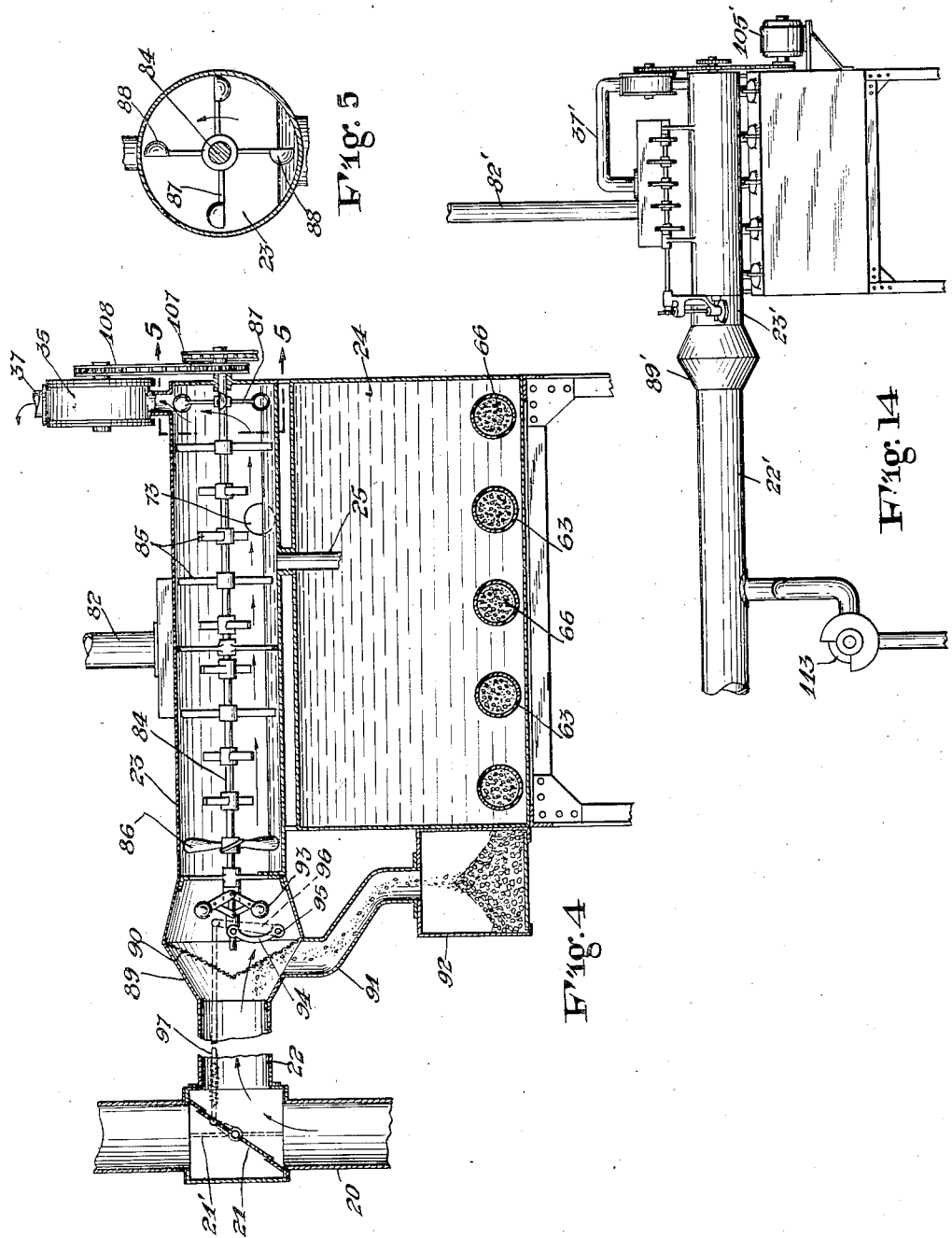
INVENTOR
SILVIO MAGATON
BY
ATTORNEY Patented May 12, 1936

2,040,700

UNITED STATES PATENT OFFICE 2,040,700

SMOKE AND DUST ABSORBING APPARATUS

Silvio Magaton, New York, N. Y.

Application October 12, 1934, Serial No. 748,065

13 Claims. (Cl. 261—93)

This invention relates to apparatus for purifying gases; more particularly the invention refers to improvements in apparatus for freeing gases from solid particles suspended therein, or carried thereby, especially gases which are discharged into the surrounding air, in order to prevent air pollution.

In some of the methods now in use for removing solid particles from gases discharged from industrial plants, use is made of the principle of creating a suction at the point where the gases or dust-laden air originate, so as to remove said gases or air and carry them to a distant point, where they are allowed to settle, with or without filtration, or with or without causing them to come in contact with some liquid, such as water, assisting in the separation of the solid particles from the gases.

In all cases, the gases are caused to flow continuously through that part of the apparatus where the solid particles are to be collected, said part usually comprising a chamber within which the velocity of the gases therein discharged will be considerably reduced, due to the fact that the area of the chamber is much greater than that of the pipes through which the gases are discharged. Nevertheless, the continuous character of the discharge creates a condition whereby the gases will retain a state of turbulence even when they have reached the collecting chamber, so that a material portion of the solid matter will continue to be carried in suspension thereby when the gases are finally discharged in the surrounding air. Furthermore, apparatus of this type requires relatively large and costly installations.

In some cases, the dust-laden gases are discharged directly into a body of water or in a chamber where they come into contact with water, the water facilitating the precipitation of the solid particles; but even then the constant flow prevents the gases from reaching that condition of low velocity or virtual rest which is absolutely necessary for the solid particles to settle.

The main object of my invention is to provide, in apparatus for removing solid particles from gases flowing in a continuous current, means for directing the gas current first through one and then successively through each of the others of a number of separate passages containing filtering material, preferably in contact with a liquid, said passages discharging said gases into a body of liquid maintained substantially at atmospheric pressure; the result being that the gas current is directed through each passage at spaced intervals of time, long enough to permit each resulting intermittent gas supply for each passage to gradually lose its pressure, and consequently its velocity, in going through the filtering material and the body of liquid into which it is discharged, so that a thorough cleansing of said gases will be effected.

A further object is to provide a compact and effective gas purifying apparatus, adapted to treat relatively large volumes of gases in continuous flow, whereby solid particles suspended in or carried by said gases will be thoroughly removed and the gases discharged from the apparatus in a clean condition.

Other objects and advantages of the present invention will more fully appear as the description proceeds and will be set forth and claimed in the appended claims.

My invention is illustrated by way of example in the accompanying drawings, in which:

Fig. 1 is a front view in elevation, partly broken away and sectioned, of an apparatus embodying my invention;

Fig. 2 is an end view in elevation thereof;

Fig. 3 is a plan view of the same;

Fig. 4 is a vertical longitudinal section of the same through line 4—4 of Fig. 3;

Fig. 5 is a cross sectional view of a detail through line 5—5 of Fig. 4;

Fig. 6 is a vertical cross section of the same through line 6—6 of Fig. 3;

Fig. 7 is a fragmentary rear view in elevation of the lower part of the tank forming part of my apparatus;

Fig. 8 is a fragmentary longitudinal section in an enlarged scale of the discharge end of one of the filtering passages shown in Fig. 6;

Fig. 9 is an end view thereof;

Fig. 10 is a detail illustrating a way of connecting a screen shield to the discharge end of the passage shown in Figs. 6, 8, and 9;

Fig. 11 is a fragmentary longitudinal vertical section through line 11—11 of Fig. 3, illustrating the preferred manner of discharging the cleansed gases;

Fig. 12 is a fragmentary vertical cross section, in an enlarged scale, through the gas distributing chamber;

Fig. 13 is a fragmentary horizontal section through line 13—13 of Fig. 12; and

Fig. 14 is a front view in elevation, illustrating the possibility of connecting the apparatus to the collector of a dust removing system for grinding and polishing wheels.

In the drawings Figs. 1 to 13 illustrate an apparatus embodying my invention, serving a furnace flue, for the purpose of deflecting therefrom the smoke and other gaseous products of combustion, in order to free them from all dust and solid matter and return them to the flue or chimney in a purified condition.

In said drawings 20 designates the furnace flue or chimney, provided with a damper 21, and connected by a pipe 22 to the suction end of a tubular chamber 23, forming part of the apparatus.

Said chamber 23 is preferably cylindrical in section and extends longitudinally above a supporting tank 24, and the bottom of said chamber is connected to the inside of said tank by a pipe 25, which preferably extends downwardly from said chamber 23 to a point 26 close to the front of the tank in proximity of the bottom 27 thereof.

Another hollow, preferably cylindrical, shell 28, frontwardly spaced with respect to chamber 23, also extends longitudinally above the tank, said shell being provided with a number of longitudinally spaced partitions 29, separating it into a plurality of chambers, shown as five in the case illustrated, designated by numerals 30, 31, 32, 33, 34.

An air pump 35 is mounted on chamber 23 at the rear end thereof, the suction end of said pump being connected to said chamber by a tubular connection 36. A conduit 37 extends from the delivery end of said pump to a distributing chamber 38, the bottom of which is provided with five longitudinally spaced outlets, such as shown at 39, in Figs. 12 and 13, each outlet being controlled by a slide valve 40. Each outlet 39 is connected to one of the chambers formed within shell 28, five tubular connections, 41, 42, 43, 44, 45, being thus provided leading to chambers 30, 31, 32, 33, 34, respectively.

Each valve 40 is provided with a stem 46, projecting through the front wall 47 of the distributing chamber 38, said stem carrying a roller 48 at its outer end and being urged outwardly to the valve closing position by a spring 49.

A shaft 50, longitudinally extending in front of distributing chamber 38 at a suitable distance therefrom, carries five cams, 51, 52, 53, 54, 55, each one of which bears against the roller 48 carried by the stem of the corresponding valve 40. During each revolution of shaft 50, each cam will cause one reciprocating motion of the corresponding valve 40 to the open position shown in Figs. 12 and 13, the corresponding spring 49 returning it to the closed position.

The five cams are evenly spaced in an angular sense with respect to one another along an entire circumference about the axis of shaft 50. By virtue of this arrangement it follows that while one valve 40 is entirely open the other four valves are closed, and when the valve which was open begins to close another valve begins to open, and will reach the fully open position when the formerly open valve will have reached the fully closed position. The result is that the outlet area for the gases discharged from the distributing chamber will remain constant at all times, providing for the continuity of flow of the gases delivered to the distributing chamber through pipe 37.

The top of tank 24, at the front end thereof, is provided with five openings, one in correspondence of each chamber 30, 31, 32, 33, 34, said openings being normally closed by covers 56, 57, 58, 59, 60. From each opening downwardly and rearwardly extends within the tank a tubular member 61, the front end of which is provided with a removable cover 62, and the rear end of which, 63, is provided with a removable screen cap 64, as shown in Figs. 8 and 9. The front end of each tubular member 61 communicates by means of a tubular connection, such as shown at 65 in Fig. 6, with the corresponding chamber of shell 28. Each tubular member 61 is furthermore filled with various filtering materials, preferably divided into sections. In practice, I have found that a body, 66, constituted by pieces of sponge rubber at the rear end, followed by a body, 67, of gravel, and then by a body, 68, of coke and finally by a body, 69, of charcoal, serves admirably.

The lower part of the tank is provided along its rear wall 60 with an opening 71, directly opposite the rear or discharge end of tubular members 61, said opening being normally tightly closed by a cover 72. The bottom of chamber 23 is provided with a rearward extension 73, having a cap 74 through which liquid, such as water, may be poured into chamber 23 and an overflow outlet 75 having for its object to maintain a predetermined liquid level within chamber 23 and chambers 30, 31, 32, 33, 34.

When a liquid, such as water, is poured into extension 73, it will reach the inside of the tank 24 through pipe 25, filling said tank as Fig. 6 clearly shows. At the same time said liquid will seep through the filtering material contained in tubular members 61 and through connections 65 will reach chambers 30, 31, 32, 33, 34. When the liquid reaches the level set by the position of overflow 75, whereby a certain amount of liquid will remain at the bottom of chamber 23, and chambers 30, 31, 32, 33, 34, the device is in condition to function.

At the top tank 24 is provided with an outlet 76 from which upwardly extends a tube 77, which is preferably L-shaped, its horizontal leg 78 being encased within a chamber 79 filled with gravel 80, and being provided with a number of perforations 81. The top of chamber 79, that I will call a bubbling chamber, is provided with a discharge conduit 82, that, in the case illustrated, is shown leading to flue 20 at a point, 83, beyond the damper 21.

A shaft 84 extends longitudinally of chamber 23 and carries a number of agitating blades 85; furthermore, in proximity of its front end said shaft preferably carries a suction fan 86 and at its rear end it carries a spider 87, each arm of which terminates in a cup, such as shown at 88 in Fig. 5, said spider being directly opposite suction inlet 36 of the air pump.

As Figs. 4 and 5 clearly show, the cups 88 of the spider during the rotation of shaft 84 dip into the liquid at the bottom of chamber 23 and carry a certain part of it around and up to a point just opposite the suction inlet, so that the smoke and gases sucked up by the air pump will come in contact with liquid particles at such point.

At the front, chamber 23 is preferably provided with a gland shaped extension 89 leading to pipe 22, the front end of said gland extension being provided with a screen 90, and a discharge conduit 91 in front of said screen leading to a collecting receptacle 92.

In the arrangement illustrated where, as stated, the apparatus is used in connection with a flue or chimney, the other end of shaft 84 is shown provided with a centrifugal device 93, the axially movable member of which is connected with a lever 94, mounted on a shaft 95, which shaft carries another lever, shown in dotted lines at 96, connected by a rod 97 to the damper 21. In Fig. 4 the centrifugal device is shown in its operative position due to the rotation of shaft 84, in which a pull is exerted on lever 94 causing the damper 21 to assume the position shown, where the smoke and gases discharged from the furnace into the flue are deflected into pipe 22. When the apparatus is at rest, and shaft 84 remains stationary, rod 97 will move damper 21 to the position 21', shown in dotted lines in said Fig. 4, where the draft will be established in the normal way directly through the flue or chimney.

Another shaft 98 runs longitudinally through shell 28 traversing all the chambers 30, 31, 32, 33, 34, and carrying agitating blades 99. At the forward end, said shaft carries a worm 100, in mesh with a wormwheel 101, carried by a shaft 102, provided at its upper end with another worm 103, meshing with a wormwheel 104 carried by the front end of shaft 50. The geared connection thus described will transmit to shaft 50 the rotation of shaft 98 at a greatly reduced rate.

Shaft 98 is driven by a motor 105, by means of a chain 106, and the rotation of said shaft is transmitted to shaft 84 by means of a chain 107 and to the rotor of pump 35 by means of a chain 108.

Overflow 75 leads to a discharge pipe 109, provided with a funnel-shaped upper end 110 and the bottom of tank 24 is provided with a drain pipe 111, controlled by a valve 112.

In Fig. 14 the gland shaped extension 89' at the suction end of chamber 23' is shown connected to the collector 22' of a dust collecting system serving a number of grinding and polishing wheels 113 and the discharge pipe 82' of the device is shown leading the purified air to some outside point in the surrounding atmosphere.

In operation, suction fan 86 creates a suction through pipe 22 and a rearwardly directed draft through chamber 23, said suction and draft being assisted by the suction created by air pump 35. As a result, the smoke and dust-laden air and gas rising in flue 20 will pass through screen 90 and travel towards the rear of chamber 23 to the inlet 36 of the air pump. The screen 90 will separate the heavier solid particles, which will fall through conduit 91 into receptacle 92.

While the screened gaseous current travels through chamber 23 it is kept in continuous agitation together with the liquid lying at the bottom of chamber 23 by agitating blades 85, so that the gaseous substances are kept in continuous contact with the liquid and the wet surfaces of the blades. A further separation of the solids held in suspension or carried by the gases will, therefore, occur, the greater part of said solids being ultimately retained within the liquid at the bottom of chamber 23 and eventually finding their way to the bottom of tank 24 through pipe 25.

When the partially purified air and gases reach inlet 36 of the air pump they come into intimate contact with liquid carried in proximity of said inlet by cups 88 of spider 87.

The air pump now directs the gaseous current to distributing chamber 38 and from this chamber said gases reach in succession one or the other of the chambers provided within shell 28. In these chambers the gases undergo a second washing and scrubbing, due to the action of agitating blades 99, which dip into the liquid lying at the bottom of said chambers, so that said air and gases will then reach the filtering passages 61 in an almost clear condition.

As stated, the gaseous current is discharged from the chambers 30, 31, 32, 33, 34, into the corresponding filtering passages 61 through tubular connections 65, and will reach the liquid within tank 24 by seeping through the filtering material while its pressure gradually decreases, the gases finally bubbling through the liquid contained in tank 24 and reaching chamber 79 through tube 77, being ultimately discharged from said chamber through conduit 82.

During the passage through the wet filtering material the gases will undergo a final and thorough cleansing so that they issue from the apparatus in a perfectly clean condition.

The arrangement shown, whereby the gases are first discharged from the tank into chamber 79 above it, said chamber being filled with gravel or like material, serves the purpose of providing an outlet for the liquid tending to rise from the tank due to the pressure exerted by the fractional currents of gases discharged therein.

This is the reason for extending pipe 25 to a point close to the bottom of the tank at the front thereof, because the gases being discharged at the rear will tend to rise with the liquid in a vertical direction and will not cause any material reflux of the liquid into chamber 23.

In time part of the solids removed from the flowing gases will collect at the bottom of tank 24, part will remain in suspension in the liquid within said tank and part will adhere to the filtering material within passages 61, so that eventually the apparatus will become saturated with such solids and its efficiency will be lowered. At such times, a cleaning of the tank and passages 61 will be in order. This operation can easily be effected by draining the liquid through discharge outlet 111, subsequently removing cover 72 at the rear of the tank, then removing screen caps 64 from the rear end of passages 61, removing covers 56, 57, 58, 59, 60 and covers 62 at the front, and forcing out bodily the filtering material from passages 61, discharging it from the rear end thereof through rear opening 71. Screen caps 64 are then replaced, passages 61 are refilled with new filtering material, covers 56, 57, 58, 59, 60, and 62 are then replaced, as well as cover 72, valve 112 is closed and the tank is refilled, after which the apparatus is once more ready for service.

It will be observed that by virtue of the arrangement illustrated, the gases are first subjected to scrubbing operations in various stages whereby the bulk of the solids carried by said gases is removed. The gases are then subjected to a wet filtering process under gradually decreasing pressure, causing the remaining solid particles to be entirely removed from the gases; the decrease in pressure taking place without interfering in the least with the continuity of discharge of the gases, due to the fact that said gases are discharged intermittently at different points.

My device is, therefore, essentially a wet gas purifying apparatus, its operation being rendered extremely efficient by the loss in velocity of the gases which follows their decrease in pressure due to their alternate discharge through a plurality of filtering passages without disturbing the continuity of flow. The efficiency of the apparatus is further enhanced by the preliminary scrubbing operations to which the gases are subjected.

From the foregoing it will be seen that I provide an entirely new apparatus for treating gases in motion for the purpose of removing solids therefrom. My invention can be carried into practice by means of apparatus different in design from that shown by way of example; the drawings therefore, should be understood as being intended for illustrative purposes only and not in a limiting sense.

I accordingly reserve the right to carry my invention into practice in all those ways and manners which may enter, fairly, into the scope of the appended claims.

I claim:

1. In apparatus for treating gases for removing solid matter therefrom the combination, with means for directing a current of said gases through the apparatus, of a tank for containing liquid, a plurality of passages for said gases extending and discharging within said tank, normally sealed removable cover means through the wall of said tank in proximity of the discharging end of said passages, normally sealed removable closing means at the other end of said passages, permitting, when removed, access thereto, filtering material within said passages, and means for successively directing said gases first through one and then through each of the others of said passages, and for cutting off the passages which are to remain temporarily inactive, so as to transform the continuous flow of said gases into a sequence of intermittent flows through said passages.

2. In apparatus for treating gases for removing solid matter therefrom the combination, with means for directing a current of said gases through the apparatus, of a scrubbing chamber, a distributing chamber connected to the discharge end thereof, a plurality of filtering passages for said gases, and means for successively directing said gases from said distributing chamber first through one and then through each of the others of said passages, and for cutting off the passages which are to remain temporarily inactive, so as to transform the continuous flow of said gases into a sequence of intermittent flows through said passages.

3. In apparatus for treating gases for removing solid matter therefrom the combination, with means for directing a current of said gases through the apparatus, of a scrubbing chamber, a distributing chamber connected to the discharge end thereof, a plurality of filtering passages for said gases, a plurality of secondary scrubbing chambers connected one to each of said filtering passages, and means for successively directing said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto.

4. In apparatus for treating gases for removing solid matter therefrom the combination, with means for directing a current of said gases through the apparatus, of a scrubbing chamber, a distributing chamber connected to the discharge end thereof, a tank for containing liquid, a plurality of filtering passages for said gases extending and discharging within said tank, and means for successively directing said gases from said distributing chamber first through one and then through each of the others of said passages, and for cutting off the passages which are to remain temporarily inactive, so as to transform the continuous flow of said gases into a sequence of intermittent flows through said passages.

5. In apparatus for treating gases for removing solid matter therefrom the combination, with means for directing a current of said gases through the apparatus, of a scrubbing chamber, a distributing chamber connected to the discharge end thereof, a tank for containing liquid, a plurality of filtering passages for said gases extending and discharging within said tank, a plurality of secondary scrubbing chambers connected one to each of said filtering passages, and means for successively directing said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto.

6. In apparatus for treating gases for removing solid matter therefrom the combination, with means for directing a current of said gases through the apparatus, of a scrubbing chamber, a distributing chamber connected to the discharge end thereof, a tank for containing liquid, a plurality of passages for said gases extending and discharging within said tank, normally sealed removable cover means through the wall of said tank in proximity of the discharging end of said passages, normally sealed removable closing means at the other end of said passages, permitting, when removed, access thereto, filtering material within said passages, and means for successively directing said gases first through one and then through each of the others of said passages, and for cutting off the passages which are to remain temporarily inactive, so as to transform the continuous flow of said gases into a sequence of intermittent flows through said passages, a plurality of secondary scrubbing chambers connected one to each of said filtering passages, and means for successively directing said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto.

7. In apparatus for treating gases for removing solid matter therefrom the combination, with means for directing a current of said gases through the apparatus, of a scrubbing chamber, a distributing chamber connected to the discharge end thereof, a plurality of filtering passages for said gases, and means for successively directing said gases from said distributing chamber first through one and then through each of the others of said passages, and for cutting off the passages which are to remain temporarily inactive, so as to transform the continuous flow of said gases into a sequence of intermittent flows through said passages, while maintaining a substantially uniform area of discharge from said distributing chamber.

8. In apparatus for treating gases for removing solid matter therefrom the combination, with means for directing a current of said gases through the apparatus, of a scrubbing chamber, a distributing chamber connected to the discharge end thereof, a plurality of filtering passages for said gases, a connection interposed between each filtering passage and said distributing chamber, valves controlling said connections, and a rotatable camshaft controlling and adapted to operate said valves seriatim, so as to successively direct said gases from said distributing chamber first through one and then through each of the others of said passages, and cutting off the passages which are to remain temporarily inactive, so as to transform the continuous flow of said gases into a sequence of intermittent flows through said passages.

9. In apparatus for treating gases for removing solid matter therefrom, a tank, a tubular scrubbing chamber mounted on and communicating with said tank, a shaft carrying agitating arms rotatably mounted within said chamber, a tubular shell divided into a plurality of secondary scrubbing chambers also mounted on said tank, a distributing chamber having its inlet end connected to the discharge end of said scrubbing chamber, and having a plurality of outlets each connected to one of said secondary scrubbing chambers, a shaft carrying agitating arms rotatably mounted through said secondary scrubbing chambers, a plurality of filtering passages for said gases extending and discharging within said tank, each of said filtering passages being connected to one of said secondary scrubbing chambers, means for directing a continuous current of gases to be treated through the inlet end of said scrubbing chamber, means for successively directing said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto, and means for actuating said shafts and gas directing means.

10. In apparatus for treating gases for removing solid matter therefrom, a tank, a tubular scrubbing chamber mounted on and communicating with said tank, a shaft carrying agitating arms rotatably mounted within said chamber, a tubular shell divided into a plurality of secondary scrubbing chambers also mounted on said tank, a distributing chamber having its inlet end connected to the discharge end of said scrubbing chamber, and having a plurality of outlets each connected to one of said secondary scrubbing chambers, a shaft carrying agitating arms rotatably mounted through said secondary scrubbing chambers, a plurality of passages for said gases extending and discharging within said tank, each of said passages being connected to one of said secondary scrubbing chambers, filtering material within said passages, means permitting access to said passages so as to permit the discharge and renewal of the filtering material therein contained, means for directing a continuous current of gases to be treated through the inlet end of said scrubbing chamber, means for successively directing said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto, and means for actuating said shafts and gas directing means.

11. In apparatus for treating gases for removing solid matter therefrom, a tank, a tubular scrubbing chamber mounted on and communicating with said tank, a shaft carrying agitating arms rotatably mounted within said chamber, a tubular shell divided into a plurality of secondary scrubbing chambers also mounted on said tank, a distributing chamber having its inlet end connected to the discharge end of said scrubbing chamber, and having a plurality of outlets each connected to one of said secondary scrubbing chambers, a shaft carrying agitating arms rotatably mounted through said secondary scrubbing chambers, a plurality of filtering passages for said gases extending and discharging within said tank, each of said filtering passages being connected to one of said secondary scrubbing chambers, valves controlling said outlets, a rotatable camshaft controlling and adapted to operate said valves seriatim so as to successively direct said gases from said distributing chamber first through one and then through each of the others of said secondary scrubbing chambers and for cutting off such of said chambers which are to remain temporarily inactive, so as to transform the continuous flow of said gases into a sequence of intermittent flows through said secondary scrubbing chambers and filtering passages connected thereto, and means for actuating said shafts and gas directing means.

12. In apparatus for treating gases for removing solid matter therefrom the combination, with means for directing a current of said gases through the apparatus, of a distributing chamber connected to the discharge end thereof, a plurality of filtering passages for said gases, and means for successively directing said gases from said distributing chamber first through one and then through each of the others of said passages, and for cutting off the passages which are to remain temporarily inactive, so as to transform the continuous flow of said gases into a sequence of intermittent flows through said passages.

13. In apparatus for treating gases for removing solid matter therefrom the combination, with means for directing a current of said gases through the apparatus, of a distributing chamber connected to the discharge end thereof, a tank for containing liquid, a plurality of filtering passages for said gases extending and discharging within said tank, and means for successively directing said gases from said distributing chamber first through one and then through each of the others of said passages, and for cutting off the passages which are to remain temporarily inactive, so as to transform the continuous flow of said gases into a sequence of intermittent flows through said passages.

SILVIO MAGATON.